United States Patent [19]

McKee

[11] Patent Number: 4,686,405
[45] Date of Patent: Aug. 11, 1987

[54] HOMOPOLAR DYNAMOELECTRIC MACHINE WITH EXTERNALLY ACTUATED BRUSHES

[75] Inventor: Bobby D. McKee, San Jose, Calif.

[73] Assignee: Westinghouse Electric Corp., Pittsburgh, Pa.

[21] Appl. No.: 912,734

[22] Filed: Sep. 29, 1986

[51] Int. Cl.<sup>4</sup> ............................................. H02K 31/00
[52] U.S. Cl. ................................... 310/178; 310/219; 310/242
[58] Field of Search .................... 310/239, 102 R, 240, 310/102 A, 241, 42, 242, 244, 245, 247, 178, 219, 254, 232; 318/253; 322/48

[56] References Cited

U.S. PATENT DOCUMENTS

| 2,094,365 | 9/1937 | Mattews | 310/178 |
| 2,230,131 | 1/1941 | Chandeysson | 310/178 |
| 2,539,569 | 1/1951 | Clark | 310/178 |

FOREIGN PATENT DOCUMENTS 8604191  1/1986  Int'l Pat. Institute ............. 310/178

*Primary Examiner*—R. Skudy
*Attorney, Agent, or Firm*—R. P. Lenart

[57] ABSTRACT

A homopolar dynamoelectric machine is provided with a stator structure having an interior surface defining an internal space for receiving a generally cylindrical rotor which is mounted for rotation with respect to the stator structure. A plurality of brush assemblies are positioned between the stator interior surface and an exterior surface of the rotor and are capable of making sliding electrical contact with the rotor exterior surface. Each of the brush assemblies is connected by way of a brush drive rod to a brush actuator which is positioned on an external surface of the stator structure, to control radial displacement of the brushes. By mounting the brush actuators on an external stator surface, a reduction in stator size and weight is achieved.

5 Claims, 4 Drawing Figures

HOMOPOLAR DYNAMOELECTRIC MACHINE WITH EXTERNALLY ACTUATED BRUSHES

STATEMENT OF GOVERNMENT INTEREST

The United States Government has rights in this invention pursuant to Contract No. F08635-84-C-0331 awarded by the Department of Defense.

BACKGROUND OF THE INVENTION

This invention relates to homopolar dynamoelectric machines and more particularly to drum type homopolar machines having radially movable current collecting brushes.

Homopolar generators have been successfully designed for providing short duration pulses having peak current levels in excess of a million amperes DC. Such generators generally include a cylindrical rotor of either a drum or disc configuration, mounted in a stator and rotated about a central axis. A field coil encircling the rotor and connected to an external current supply provides an applied field excitation passing through the rotor. The applied magnetic field excitation is usually confined and directed by a ferromagnetic stator structure surrounding the field coil and all, or a portion of, the rotor. When the rotor is spinning, free electrons within the rotor experience an electromotive force resulting from their interaction with the applied magnetic field excitation. Brushes, positioned adjacent to the surface of the rotor, are then lowered onto the spinning rotor to allow an external current to flow under the influence of such electromotive force through return conductors to an external circuit and then back onto the rotor through additional brushes at a different location. Interaction between the discharge current and the applied magnetic field excitation creates a force which decelerates the rotor. It has been found that extremely high current pulses may be obtained by using a relatively low power conventional prime mover or a conventional low voltage, low amperage power source to store initial energy in the rotor by gradually motoring the rotor up to the desired rotational speed.

Drum type homopolar dynamoelectric machines include a stationary excitation system and a rotating drum composed of a combination of ferromagnetic and highly conductive materials configured such that a direct current output voltage is produced along the axial length of the drum. These machines incorporate a set of current collection members at either axial end of the rotor, which carry full load current. Homopolar dynamoelectric machines may operate as either a motor or generator and are particularly suited to transfer energy in short, high current pulses to a storage inductor and a final load consisting of, for example, a resistive-inductive system. The rotor of a drum type homopolar machine may include a cylindrical shell of a highly conductive, non-ferromagnetic material which supports the full load current. This member is bonded or shrunk onto a ferromagnetic inner cylindrical core which serves as the main rotor body and is directly attached to a drive or input shaft. Both components of the rotor are, preferably, homogeneous materials without segmentation or any combination or axial or circumferential grooves. The machine's internal electromotive force is generally confined to an axial zone along the center of the rotor between two outer current collection zones.

Since homopolar generators are used to provide high current, short duration pulses, which may be in excess of one million amperes, steps must be taken to minimize brush wear and to minimize heat generated in the current collection zones of the rotor. This is usually accomplished by providing brush actuators which are used to move the brush assemblies into and out of sliding electrical contact with the current collection zones of the rotor. In general, these brush actuators are located within the stator structure thereby requiring a stator structure which is large enough to contain the actuators. However, for certain homopolar generator applications, for example, airborne and space applications, it is desirable to reduce over-all weight and size of the machines.

SUMMARY OF THE INVENTION

The present invention seeks to provide a homopolar dynamoelectric machine having reduced size and weight in comparison to prior art machines by including externally actuated brush assemblies. A homopolar dynamoelectric machine constructed in accordance with the present invention includes a stator structure having an interior surface defining an internal opening. A generally cylindrical rotor having a central axis is positioned within the central opening and mounted for rotation with respect to the stator structure. A plurality of brush assemblies are positioned between the interior surface of the stator structure and an exterior surface of the rotor and are capable of making electrical contact with the rotor exterior surface. Each of the brush assemblies is connected by way of a brush drive rod to an external brush actuator positioned on an external surface of the stator structure. By using external brush actuators, the stator structure can be fabricated such that the space between the interior surface of the stator and the exterior surface of the rotor, which contains the brush assemblies, is insufficiently wide in a radial direction to contain the brush actuators, thereby achieving a reduction in stator size and weight.

To facilitate maintenance, the stator structure includes a plurality of removable brush access covers, each positioned adjacent to at least one of a brush assemblies in a radial direction and being large enough to permit removal of the adjacent brush assembly through an opening in the stator created by the removal of the brush access cover. The brush drive rods which connect the brush assemblies to the brush actuators pass radially through each of the brush access covers.

DESCRIPTION OF THE PREFERRED EMBODIMENT

Figure 1:
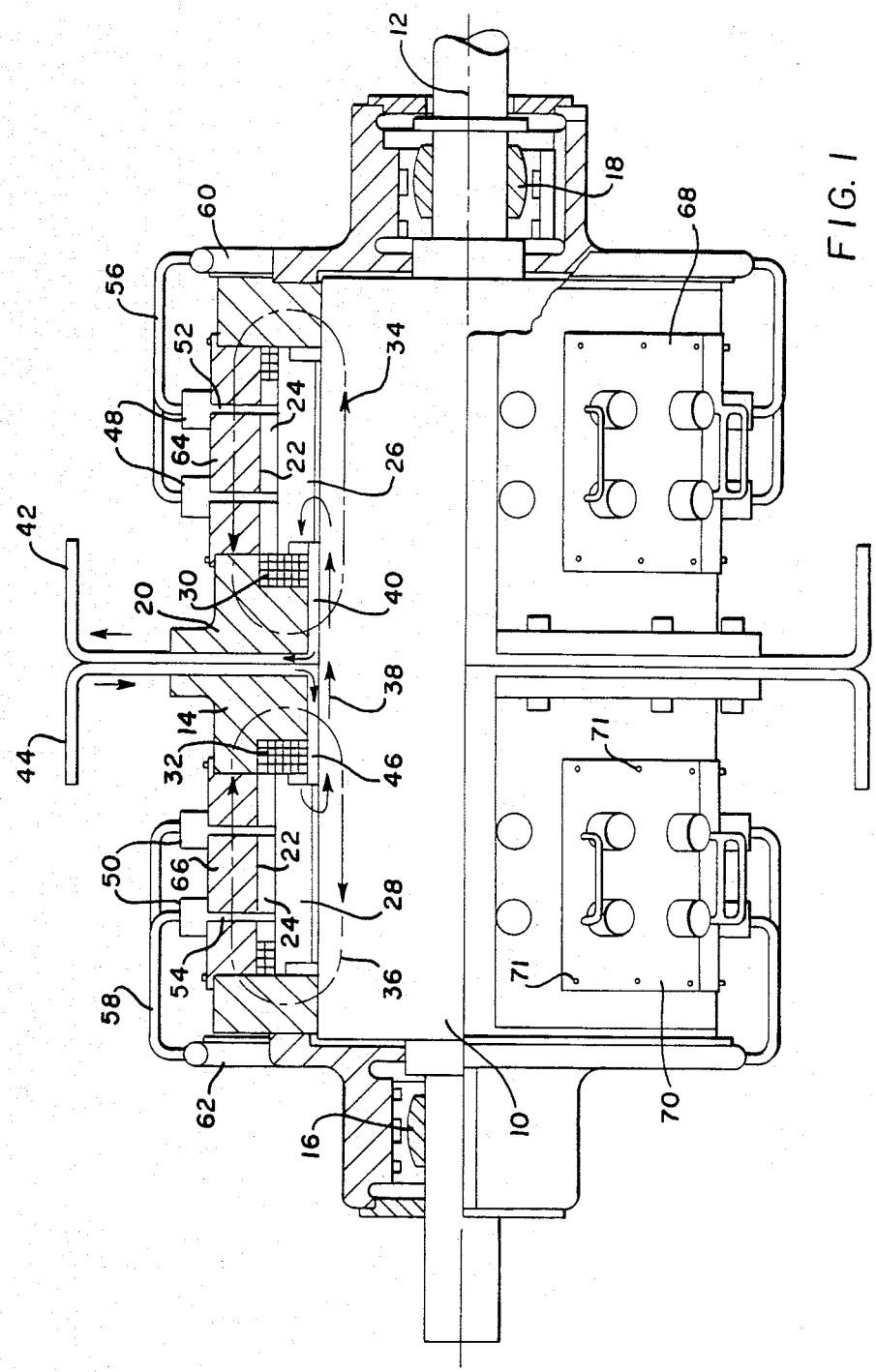
FIG. 1 is a side view, partially in cross section, of a homopolar dynamoelectric machine constructed in accordance with one embodiment of the present invention.

Referring to the drawings, FIG. 1 is a side view, partially in cross section, of a homopolar dynamoelectric machine constructed in accordance with one embodiment of the present invention. This machine includes a generally cylindrical rotor 10 having a central axis 12 and mounted for rotation within a ferromagnetic stator structure 14 by way of bearings 16 and 18. The stator structure 14 has an interior surface 22 which defines a space 24 in which a plurality of brush assemblies 26 and 28 and the rotor 10 are located. Field excitation coils 30 and 32 are supported by the stator structure and are positioned adjacent to a main pole piece 20 which directs magnetic flux, created by current flowing in the excitation coils, radially into a central portion of the rotor as illustrated by flux paths 34 and 36. Rotation of the rotor 10 causes an electromotive force to be produced axially along the surface of the rotor such that when brush assemblies 26 and 28 are lowered to make sliding electrical contact with the exterior surface of the rotor, electric current as illustrated by the solid arrows 38 flows axially along the surface of the rotor into brush assembly 26, through a cylindrical conductor 40 and out to an external circuit by way of conductor 42. This current returns from the external circuit by way of conductor 44, flows through cylindrical conductor 46, and flows back to the rotor through brush assembly 28. Radial movement of the brush assemblies is controlled by brush actuators 48 and 50 which are positioned on an external surface of the stator. These brush actuators, which may be constructed in accordance with known technology, are connected to their respective brush assemblies by way of detachable brush drive rods 52 and 54, made of an insulating material. The illustrated brush actuators are pneumatically driven pistons which are connected by way of pneumatic lines 56 and 58 to a pair of pneumatic manifolds 60 and 62.

Figure 2:
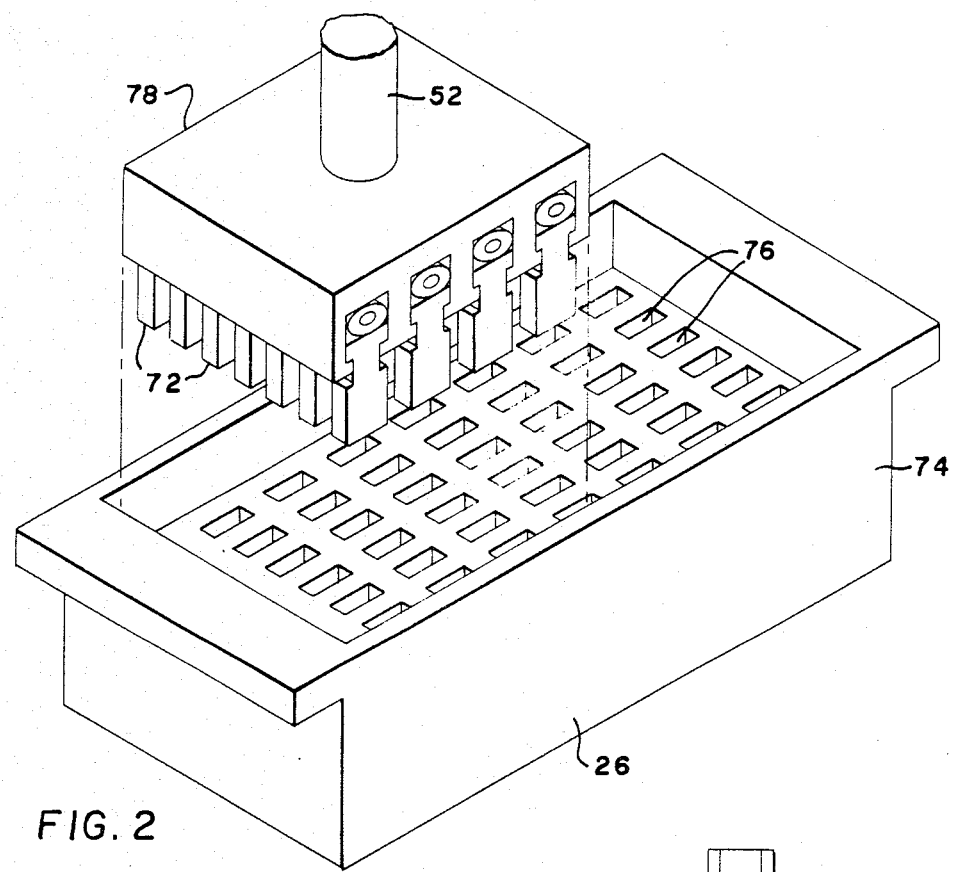
FIG. 2 is a pictorial view of a brush assembly which may be used in the machine of FIG. 1.

A plurality of removable brush access covers 64, 66, 68 and 70 form parts of the stator structure and are held in place by a plurality of bolts 71. The covers are positioned radially adjacent to each of the brush assemblies and sized such that an opening created by their removal permits the removal of each adjacent brush assembly for easy maintenance. FIG. 2 is a pictorial view of the brush assembly 26 of FIG. 1 which shows that the brush assembly includes a plurality of contact elements 72 which are inserted in a generally rectangular box-like structure 74 having a matrix of openings 76 for receiving the contact elements. Brush drive rod 52 is detachably connected to the top 78 of the brush assembly 26.

Figure 3:
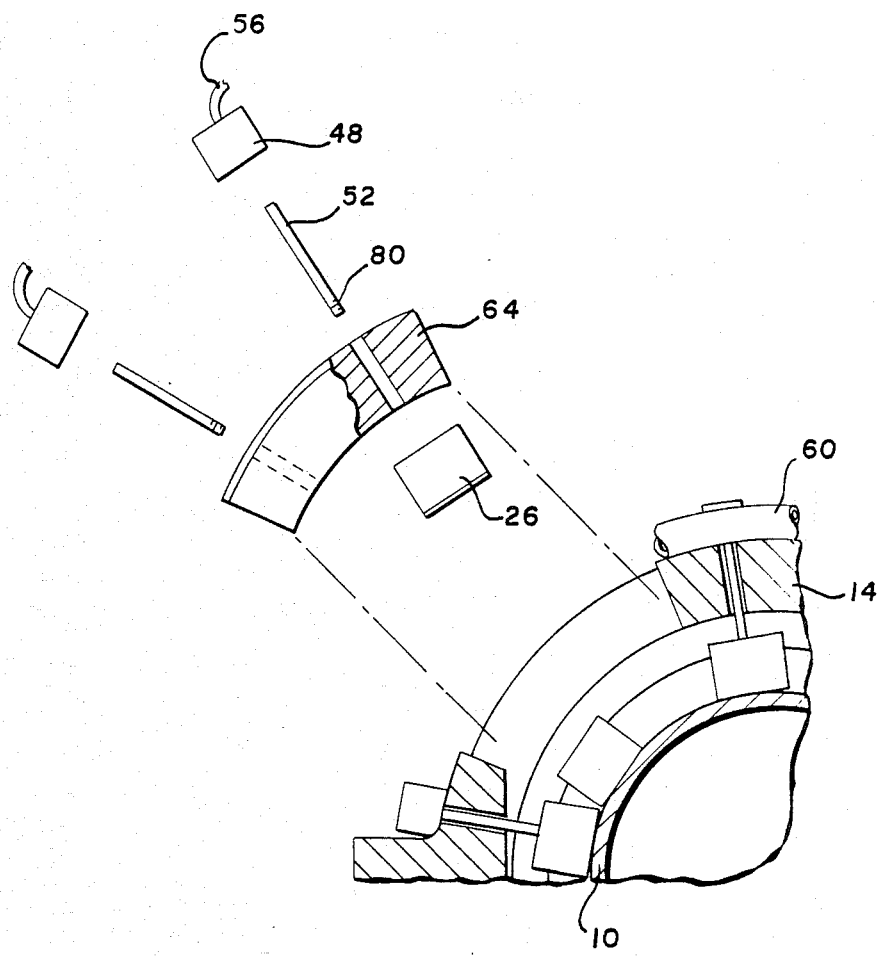
FIG. 3 is an exploded view, partially in cross section, of a portion of the machine of FIG. 1.

FIG. 3 is an exploded view of a portion of the machine of FIG. 1 which illustrates that the removal of brush access cover 64 permits the removal of brush assembly 26 for maintenance purposes. FIG. 3 also shows that brush drive rod 52 includes a threaded portion 80 which permits its removal from the top of brush assembly 26.

Figure 4:
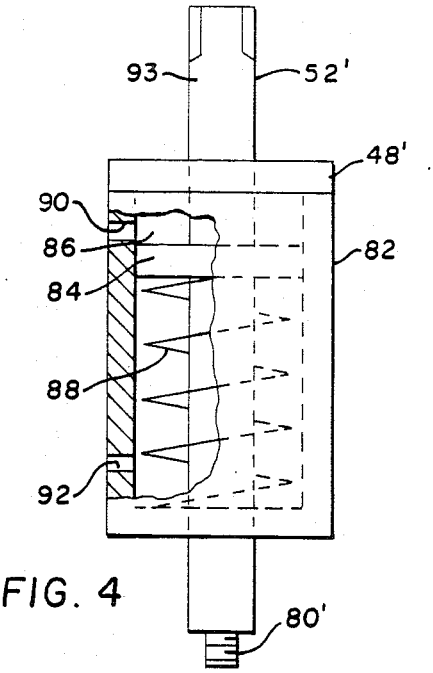
FIG. 4 is a side view, partially cut away, of an alternative brush actuating mechanism which may be used in the present invention.

FIG. 4 is a side view of an alternative brush actuator 48' which may be used in the present invention. In this embodiment, drive rod 52' extends through pneumatic cylinder 82 and is attached to a piston 84 positioned within a space 86 inside cylinder 82. A spring 88 serves to retract an associated brush assembly when the actuator is not pressurized. Air supplied through port 90 pushes the piston and drive rod down to force an associated brush assembly into contact with a spinning rotor. A breather port 92 is provided beneath piston 84. With this embodiment, one can tell at a glance, whether or not the brushes have been activated by merely observing the extent to which the end portion 93 of drive rod 52' protrudes from the cylinder.

The use of externally actuated brush assemblies permits a reduction in the over-all size and weight of the stator structure. For example, in one design in which the stator accounted for 65% of the machine's total weight, the use of external brush actuators permitted a machine total weight reduction of 12%. Referring to FIG. 1, it should be apparent that the space between the internal surface of each brush access cover and the rotor, which houses the brush assemblies, is insufficient in a radial direction to also house the brush actuators.

Although the present invention has been described in terms of what is at present believed to be its preferred embodiment, it will be apparent to those skilled in the art that various changes may be made without departing from the scope of the invention. It is therefore intended that the appended claims cover such changes.

What is claimed is:

1. A homopolar dynamoelectric machine comprising:
    a stator structure having an interior surface defining an internal space;
    a generally cylindrical rotor having a central axis, being positioned within said internal space and being mounted for rotation with respect to said stator structure;
    a plurality of brush assemblies positioned between said interior surface of said stator structure and an exterior surface of said rotor and capable of making electrical contact with said rotor exterior surface;
    a plurality of brush drive rods extending through said stator structure in a generally radial direction, a first end of each of said rods being detachably connected to one of said brush assemblies;
    a plurality of brush actuators positioned on an external surface of said stator structure, each of said brush actuators being connected to a second end of one of said rods, whereby said brush actuators control radial displacement of said brush assemblies; and
    wherein the space between said interior surface of the stator structure and said exterior surface of said rotor is insufficiently wide in a radial direction to accommodate said brush assemblies and said brush actuators.

2. A homopolar dynamoelectric machine as recited in claim 1, wherein said stator structure comprises:
    a plurality of removable brush access covers, each positioned adjacent to at least one of said brush assemblies in a radial direction and each being large enough to permit removal of an adjacent brush assembly through an opening in said stator created by the removal of each brush access cover; and
    wherein each of said brush drive rods passes radially through one of said brush access covers.

3. A homopolar dynamoelectric machine as recited in claim 2, wherein said brush drive rods are made of insulating material.

4. A homopolar dynamoelectric machine as recited in claim 1, wherein each of said drive rods protrudes radially through an associated one of said brush actuators.

5. A homopolar dynamoelectric machine as recited in claim 4, wherein each of said brush actuators includes a pneumatic cylinder and a piston positioned within said cylinder and attached to one of said drive rods.

* * * * *